(12) United States Patent
Weston et al.

(10) Patent No.: US 12,179,538 B2
(45) Date of Patent: Dec. 31, 2024

(54) METHODS AND APPARATUS TO CALIBRATE A SUSPENSION SENSOR

(71) Applicant: Ford Global Technologies, LLC, Dearborn, MI (US)

(72) Inventors: Keith Weston, Canton, MI (US); Francis Aroyehun, Chelmsford (GB); David Michael Russell, Ann Arbor, MI (US); Andrew Niedert, New Hudson, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 301 days.

(21) Appl. No.: 17/901,508

(22) Filed: Sep. 1, 2022

(65) Prior Publication Data
US 2024/0075784 A1 Mar. 7, 2024

(51) Int. Cl.
*B60G 17/018* (2006.01)
*B60G 17/019* (2006.01)
*G01M 17/04* (2006.01)

(52) U.S. Cl.
CPC ....... *B60G 17/0182* (2013.01); *B60G 17/019* (2013.01); *B60G 2400/252* (2013.01); *B60G 2400/63* (2013.01); *B60G 2800/7022* (2013.01); *B60G 2800/9122* (2013.01); *G01M 17/04* (2013.01)

(58) Field of Classification Search
CPC .............. B60G 17/0182; B60G 17/019; B60G 2400/252; B60G 2400/63; B60G 2800/7022; B60G 2800/9122; B60G 2400/60; B60G 2401/10; B60G 2401/12; B60G 2401/14; G01M 17/04
See application file for complete search history.

(56) References Cited

U.S. PATENT DOCUMENTS

| | | | |
|---|---|---|---|
| 7,778,748 B2 * | 8/2010 | Probst | G01M 17/04 |
| | | | 701/33.9 |
| 8,843,290 B2 * | 9/2014 | Kulik | G01C 22/025 |
| | | | 701/79 |
| 10,532,624 B2 * | 1/2020 | Norton | G01B 21/042 |
| 11,008,014 B2 | 5/2021 | Pearson et al. | |
| 2019/0170567 A1 * | 6/2019 | Pearson | G01G 19/12 |

FOREIGN PATENT DOCUMENTS

| | | | | |
|---|---|---|---|---|
| CN | 104118295 A | * | 10/2014 | ........... B60G 17/017 |
| CN | 110836782 A | * | 2/2020 | ............ G01M 17/04 |
| CN | 110836782 | | 8/2021 | |

(Continued)

*Primary Examiner* — Spencer D Patton
*Assistant Examiner* — Benjamin A Felson
(74) *Attorney, Agent, or Firm* — Lorne Forsythe; Hanley, Flight & Zimmerman, LLC

(57) ABSTRACT

Methods, apparatus, systems, and articles of manufacture to determine the load of a vehicle via calibrate a suspension sensor are disclosed herein. An example vehicle described herein includes a force transducer, an actuator coupled to the force transducer, memory including instructions and a processor to execute the instructions to engage the actuator to a bottom surface of a vehicle, apply a first force to the bottom surface via the actuator, determine a first displacement of a first suspension component of the vehicle, and calibrate a first sensor of the vehicle based on the first force and the first displacement.

20 Claims, 9 Drawing Sheets

(56) References Cited

FOREIGN PATENT DOCUMENTS

| DE | 102017009426 A1 | * | 9/2018 | |
|----|----|----|----|----|
| KR | 20210005434 A | * | 1/2021 | |
| TW | 201814266 | | 4/2018 | |
| TW | 201814266 A | * | 4/2018 | |
| WO | WO-0243976 A1 | * | 6/2002 | ........... B60G 11/025 |
| WO | WO-2014145018 A2 | * | 9/2014 | ........... B60G 11/265 |

* cited by examiner

METHODS AND APPARATUS TO CALIBRATE A SUSPENSION SENSOR

FIELD OF THE DISCLOSURE

This disclosure relates generally to vehicle load management and, more particularly, to methods and apparatus to calibrate a suspension sensor.

BACKGROUND

All vehicles have a recommended limit on a load that can be carried by the vehicle. In some examples, there may be a gross axle weight rating (GAWR) that corresponds to a recommended limit for a given axle. Additionally, weight can be unevenly distributed on/in the vehicle. The performance of a vehicle can be improved by more evenly distributing weight on the vehicle. Thus, load distribution can often be improved by redistributing objects (e.g., cargo, passengers, etc.) to different sections of the vehicle.

SUMMARY

An example vehicle described herein includes a force transducer, an actuator coupled to the force transducer, memory including instructions and a processor to execute the instructions to engage the actuator to a bottom surface of a vehicle, apply a first force to the bottom surface via the actuator, determine a first displacement of a first suspension component of the vehicle, and calibrate a first sensor of the vehicle based on the first force and the first displacement.

An example method described herein includes engaging an actuator of the calibration system to a bottom surface of a vehicle, applying a first force to the bottom surface via the actuator, determining a first displacement of a first suspension component of the vehicle, and calibrating a first sensor of the vehicle based on the first force and the first displacement.

An example non-transitory computer readable storage medium disclosed herein includes instructions that, when executed, cause a processor to engage an actuator of the calibration system to a bottom surface of a vehicle, apply a first force to the bottom surface via the actuator, determine a first displacement of a first suspension component of the vehicle, and calibrate a first sensor of the vehicle based on the first force and the first displacement.

Figure 1:
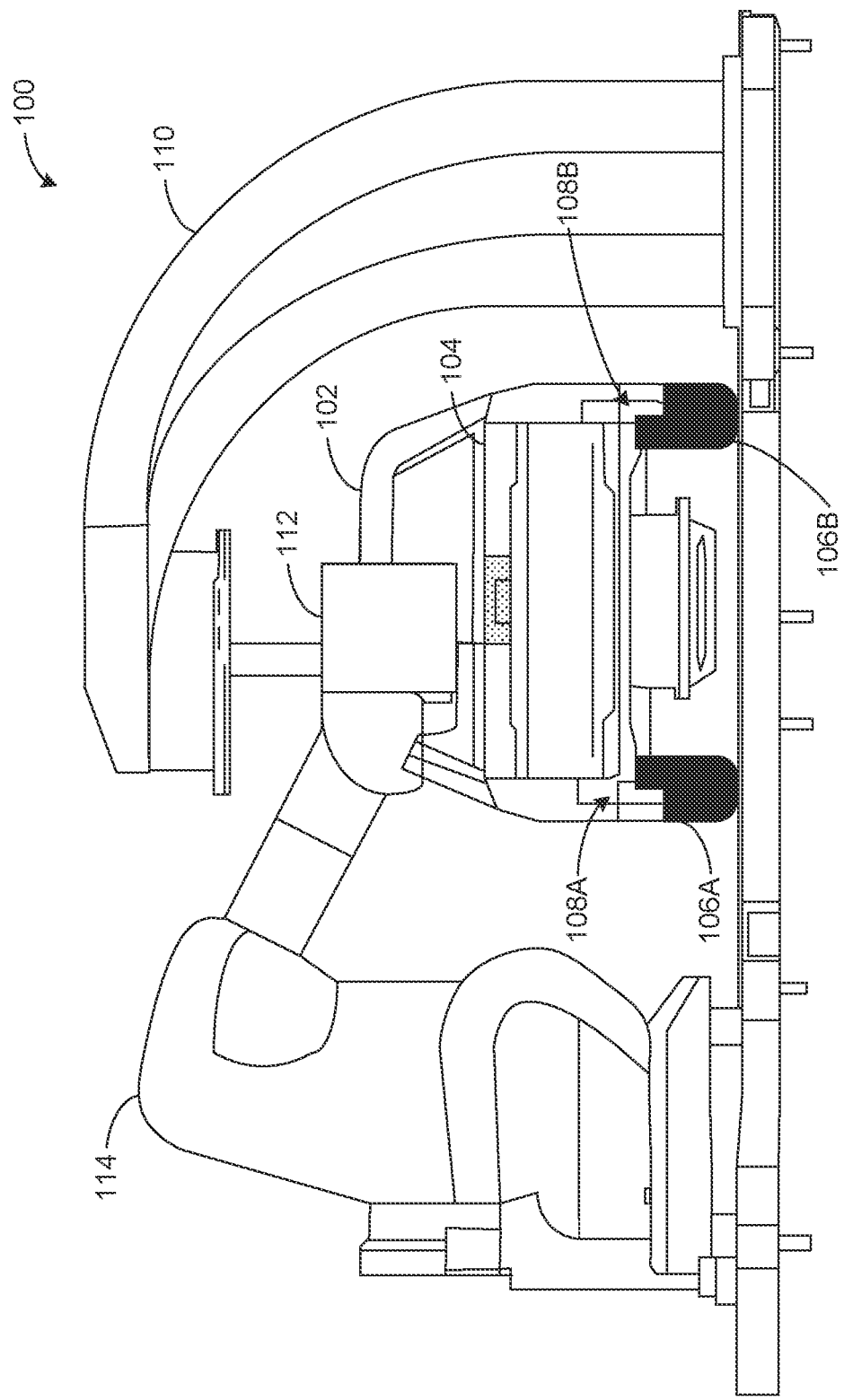
FIG. 1 is an illustration of a known calibration method of suspension sensors.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" is used to refer to directions parallel to the vertical axis.

The load on a vehicle can be determined based on ride height information and/or suspension displacement information received from suspension sensors. Particularly, vehicle computers can use vehicle suspension sensors and a suspension displacement model to determine the load carried by each of the wheels of the vehicle. In some examples, the suspension displacement model relates the displacement of the suspension components to the load of the vehicle and is generated during the calibration of the vehicle during manufacturing. In some such examples, such calibration is required because of manufacturing and/or assembly variations in the system. Example systems for determining the weight of a vehicle are disclosed in Pearson, U.S. Pat. No. 11,008,014, which is hereby incorporated by reference in its entirety.

Many prior implementations of load determination using ride-height sensors require in-plant calibration of the suspension sensors for accurate outputs due to manufacturing and assembly variations. The calibration process for suspension sensors includes the recordation of suspension displacement for a given vehicle and load on that vehicle during calibration. Some prior calibration methods for vehicles involve use of a calibration device to press down on the bed of a vehicle. As such, these prior calibration methods are not suitable for vehicles that do not include beds (e.g., vans, sports-utility vehicles, coups, sedans, etc.).

Examples disclosed herein enable the calibration of sensors on all vehicles. Examples disclosed herein use chassis system kinematics and the relationship between applied vertical forces and equivalent spring rate to establish a calibration function of force versus suspension displacement. Examples disclosed herein apply force from beneath a vehicle to enable the calibration process to be used on all types of vehicles. In some examples disclosed herein, the calibration apparatus includes an anti-roll feature to prevent the vehicle from rolling during calibration. In some examples disclosed herein, the calibration process generates a force-displacement curve based on the force applied by the calibration apparatus and the corresponding suspension displacement. In some examples disclosed herein, the data used to generate the force-displacement curve is gathered in the rebound range of the suspension and extrapolated into the compression range based on a nominal force-displacement curve of the suspension and the curb ride height of the vehicle being calibrated.

FIG. 1 is an illustration of a known calibration apparatus 100. In FIG. 1, the calibration apparatus 100 is calibrating the suspension sensors (e.g., ride height sensors, etc.) of a vehicle 102, which includes a bed 104, a first wheel 106A, a second wheel 106B, a first suspension component 108A, and a second suspension component 108B. The calibration apparatus 100 includes a press tool 110 that includes a force transducer 112. During the calibration, the location press tool 110 is controlled via a control arm 114. The calibration apparatus 100 can be used as part of the overall manufacturing and/or calibration process of the vehicle 102 prior to consumer use. In such examples, the calibration apparatus 100 can be a component of a larger assembly line. In other examples, the calibration apparatus 100 can be used in any other suitable condition.

In operation, the vehicle 102 is moved below the force transducer 112, which is lowered into the bed 104. The force transducer 112 is positioned to a predetermined location of the bed 104 by the control arm 114. After being located, the press tool 110 applies a range of loads (e.g., 40% gross axle weight rating (GAWR), 90% GAWR, 50% GAWR, etc.), which are recorded by the force transducer. The associated displacement of the suspension components 108A, 108B is monitored by the calibration apparatus 100 and/or the sensors of the vehicle 102. The applied force and the associated suspension displacement is then used to calibrate the suspension sensors of the vehicle 102.

The calibration apparatus 100 is suitable for vehicles with open beds (e.g., pick-up trucks, etc.). That is, the bed 104 is designed to bear heavy loads and is able to carry the comparatively high loads applied by the press tool 110. The calibration apparatus 100 is not suitable for vehicles with rear exterior surfaces that cannot carry loads. If the press tool 110 were to press on the upper cabin of such a vehicle, the vehicle could be damaged. Accordingly, a different calibration apparatus is needed to calibrate the suspension sensors (e.g., ride height sensors, etc.) of vans, sedans, etc.

Figure 2:
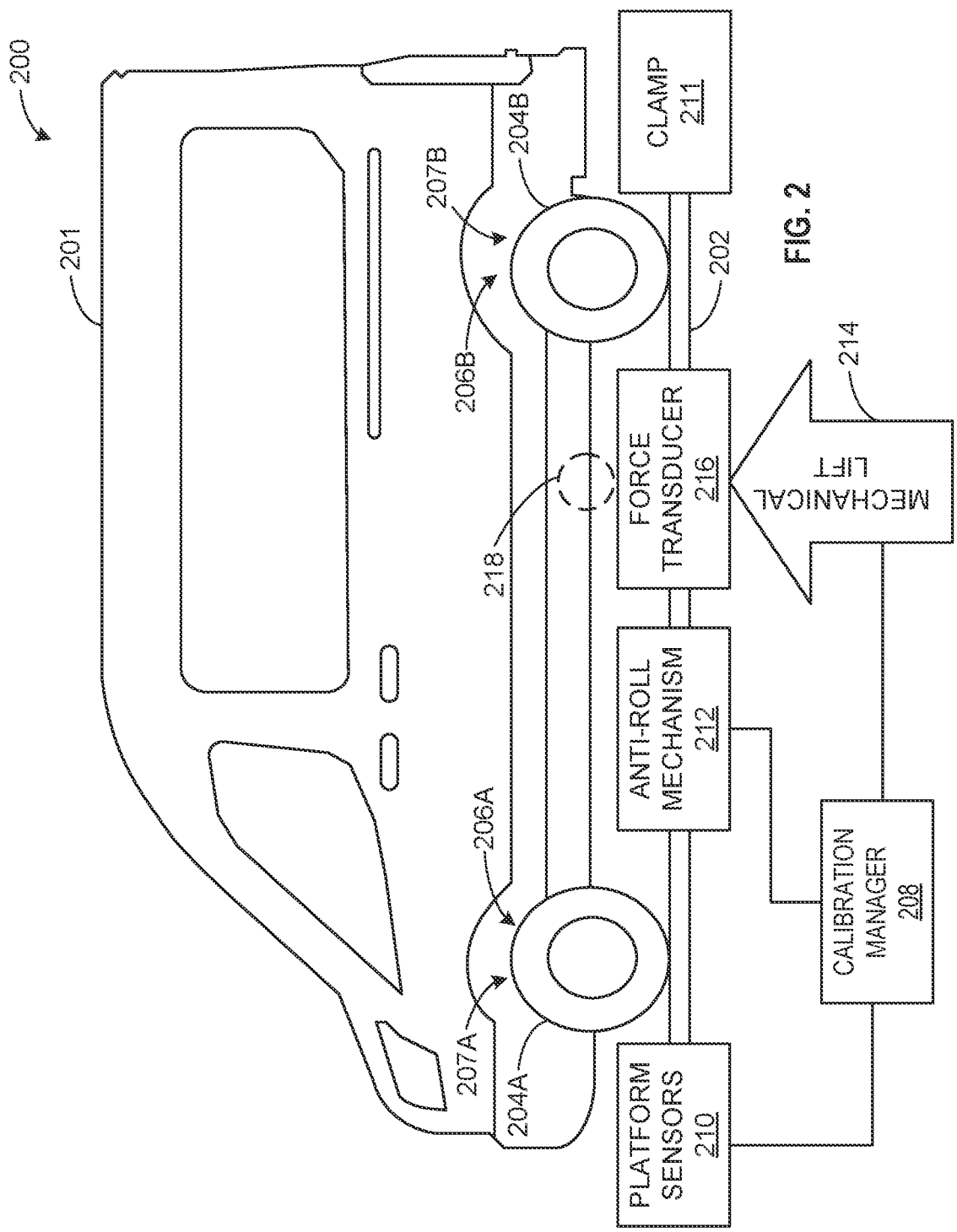
FIG. 2 is a side view of a vehicle, calibration apparatus, and calibration manager in which examples disclosed herein can be implemented.

FIG. 2 is a perspective view of an example calibration apparatus 200 and an example vehicle 201 in which examples disclosed herein can be implemented. In the illustrated example of FIG. 2, the vehicle 201 is disposed on an example platform 202 of the calibration apparatus 200. In the illustrated example of FIG. 2, the vehicle 201 includes an example first wheel 204A and an example second wheel 204B. In the illustrated example of FIG. 2, the wheels 204A, 204B have an example first suspension component 206A and an example second suspension component 206B, respectively. In the illustrated example of FIG. 2, the suspension components 206A, 206B have an example first suspension sensor 207A and an example second suspension sensor 207B, respectively.

The calibration apparatus 200 can be used as part of the overall manufacturing and/or calibration process of the vehicle 201 prior to use of the vehicle 201. The calibration apparatus 200 includes an example calibration manager 208, example platform sensors 210, an example clamp 211, an example anti-roll mechanism 212, an example lift 214 and example force transducer 216. In such examples, the calibration apparatus 200 can be a component of a larger assembly line. In other examples, the calibration apparatus 200 can be used in any other suitable condition. In some examples, the calibration apparatus 200 can be implemented by a kinematics and compliance measurement machine.

The vehicle 201 is a motorized wheel-driven vehicle. In the illustrated example of FIG. 2, the vehicle 201 is a van. In other examples, the vehicle 201 can be any type of vehicle with brakes (e.g., a sedan, a coupe, a pick-up, a sports utility vehicle, an all-terrain vehicle (ATV), farming equipment, etc.). In some examples, the vehicle 201 includes an internal combustion engine (e.g., a non-electrified vehicle, a partially electrified vehicle, etc.). In other examples, the vehicle 201 can be implemented as a fully electric vehicle. In some examples, the vehicle 201 can be a fully autonomous vehicle and/or a partially autonomous vehicle.

The platform 202 is the driving surface the vehicle 201 rests on during calibration. In some examples, the platform 202 is an elevated position to allow access to the underside of the vehicle 201. In other examples, the platform 202 can be flush with surrounding surfaces. In some examples, the platform 202 can be disposed above a mechanic's pit in which the lift 214 and/or the force transducer 216 are disposed. In other examples, the lift 214 and/or the force transducer 216 can be moved under the vehicle 201 from a lateral position.

The wheels 204A, 204B include a wheel rim and a corresponding tire. While in the illustrated example of FIG. 2, the vehicle 201 has two axles and four wheels, in other examples, the vehicle 201 can have any number of axles and wheels. In the illustrated example of FIG. 2, the first wheel 204A is a driver-side front wheel and has a corresponding passenger-side front wheel (not illustrated). The second wheel 204B is a driver-side rear wheel and has a corresponding passenger-side rear wheel (not illustrated).

The suspension components 206A, 206B are the components of the suspension system of the vehicle 201 that couple the sprung mass of the vehicle 201 (e.g., the components of the vehicle 201 above the suspension components 206A, 206B, items loaded on the vehicle 201, etc.) to the wheels 204A, 204B, respectively. The suspension components 206A, 206B absorb and/or dampen forces and vibrations transmitted between the sprung mass and the wheels 204A, 204B. In some examples, the suspension components 206A, 206B can include springs (or other similar elastic objects) and shocks/dampers. In other examples, the suspension components 206A, 206B can include other suitable means of absorbing and dampening road imperfections (e.g., air springs, etc.). The deflection of the suspension components 206A, 206B can be correlated to the load carried by each of the suspension components 206A, 206B (e.g., via Hooke's law, etc.). In some examples, the non-illustrated wheels (e.g., the passenger wheels, etc.) have corresponding suspension components analogous to the suspension components 206A, 206B.

In the illustrated example of FIG. 2, the suspension components 206A, 206B include corresponding suspension sensors 207A, 207B. The suspension sensors 207A, 207B measure the current length (e.g., extension, compression, etc.) of the suspension components 206A, 206B. In some examples, the suspension sensors 207A, 207B output a digital parameter (e.g., a voltage, current, etc.) that corresponds to the respective lengths of the suspension components 206A, 206B. In some examples, because the lengths of the suspension components 206A, 206B are directly proportional (e.g., via the known spring rate of the suspension components 206A, 206B, etc.) to the force applied the suspension components 206A, 206B, the outputs of the suspension sensors 207A, 207B can be used to determine the load carried by each of the suspension components 206A, 206B and the overall load on the vehicle 201. In some examples, the suspension sensors 207A, 207B can be implemented by ride height sensors (e.g., sensors that measure the distance between the frame of the vehicle 201 and the driving surface, etc.). In some such examples, the suspension sensors 207A, 207B can be optical ride height sensors and/or mechanical ride height sensors. Additionally or alternatively, the suspension sensors 207A, 207B can be partially implemented or fully implemented by any other suitable type of sensors (e.g., one or more optical sensors, one or more cameras, one or more strain gauges, one or more load cells, one or more piezoelectric sensors, one or more mechanical sensors, etc.).

The platform sensors 210 are sensors associated with the platform 202 and/or other components associated with the calibration apparatus 200 of FIG. 2. In some examples, the platform sensors 210 can include a sensor to detect pitch changes of the vehicle 201 (e.g., optical sensors, mechanical sensors, etc.). In some examples, the platform sensors 210 can include sensors that allow the position of the vehicle 201 on the platform 202 to be determined. In some examples, the platform sensors 210 can include the overall weight of the vehicle 201 and/or the weights carried by individual wheels of the vehicle 201 (e.g., the wheels 204A, 204B, etc.).

The clamp 211 holds the vehicle 201 on the platform 202 during operation of lift 214 and calibration manager 208. For example, the clamp 211 can engage the frame of the vehicle 201 or the body of the vehicle 201 to prevent the vehicle 201 from being lifted off the platform 202, while allowing the suspension component 206A, 206B to rebound/decompress in response to a force applied by the lift 214. In some examples, the clamp 211 can be affixed to the unsprung mass of the vehicle 201. In some examples, the clamp 211 can be absent (e.g., the force applied by the lift 214 is not sufficient to lift the vehicle 201 off of the platform, etc.).

The anti-roll mechanism 212 prevents the vehicle 201 from moving forward or backward along the longitudinal axis of the vehicle 201 during operation of the lift 214 and the calibration manager 208. For example, the anti-roll mechanism 212 can be a fixture adjacent to the platform 202 that couple, pins, and/or otherwise interacts with the frame of the vehicle 201 to prevent the vehicle 201 from rolling. In some examples, the anti-roll mechanism 212 can be absent. In some such examples, during operation of the lift 214 and calibration manager 208, the brakes of the vehicle 201 can be engaged (e.g., by an operator of the vehicle, via a command sent by the calibration manager 208 to vehicle's controller area network (CAN) bus to engage the brakes, etc.). In some examples, the anti-roll mechanism 212 and the clamp 211 can be implemented by the same fixture and/or device.

The lift 214 is an actuator that applies an upward force at a location 218. The lift 214 can apply a range of forces at the location 218 (e.g., 10% GAWR, 90% GWAR, etc.). In some examples, the lift 214 can be a hydraulic lift. In other examples, the lift 214 can be implemented by any other suitable device (e.g., a mechanical actuator, an electric actuator, a pneumatic actuator, a thermal magnetic actuator, etc.) In some examples, the lift 214 can be disposed under and/or within the platform 202. In other examples, the lift 214 can be a fixture, which moves underneath the vehicle 201 during operation of the calibration apparatus 200. The force transducer 216 is a sensor that measures the force applied by the lift 214. For example, the force transducer 216 can measure the force applied by the lift 214 and generate a proportional digital output (e.g., a voltage, a current, etc.) In some examples, the force transducer 216 can be disposed on a top surface of the lift 214 (e.g., between the top of the lift 214 and the vehicle location 218, etc.). In other examples, the force transducer 216 can be disposed at any other suitable locations. The force transducer 216 can be implemented by a strain gauge load cell, a pneumatic load cell, a hydraulic load cell, a piezoelectric load cell, and/or any other suitable device. As used herein, force transducer and the term "load cell" are used interchangeably.

The location 218 is a location of the vehicle at which the lift 214 applies lifting force to the vehicle 201. For example, the location 218 can be a reinforced point of the frame of the vehicle 201. In some examples, the location 218 can be the jack point of the vehicle. In other examples, the location 218 can be any other suitable location (e.g., an unreinforced point on the frame, etc.). In some such examples, a pad can be disposed between the lift 214 and the location 218 to further protect the vehicle 201. In some examples, if the vehicle 201 has a unibody configuration (e.g., the body and frame are an integral component, etc.), the location 218 can be a down standing flange, a suspension attachment point, etc.). In some examples, the vehicle 201 can include locations for the testing of the suspension components (e.g., the suspension components 206A, 206B, etc.) of the vehicle 201 (e.g., a location adjacent to each of the wheels of the vehicle 201, a location adjacent to each of the suspension components, etc.). In other examples, a single location can be used per axle of the vehicle 201.

In some examples, due to manufacturing and installation variations (e.g., minor variations in the thickness of vehicle components, minor variations in the location of vehicle components, minor variations in the length of vehicle components, etc.), the outputs of the suspension sensors 207A, 207B are calibrated to specific applied load inputs to ensure the suspension sensors 207A, 207B can provide accurate measurements (e.g., within 200 pounds, within 50 pounds, etc.) of the actual load disposed on the vehicle 201 during operation. In the illustrated example of FIG. 2, the output of the second suspension sensor 207B is calibrated by the calibration apparatus 200 by applying known forces to the vehicle location 218, measured by the force transducer 216, and measuring the actual output of the suspension sensor 207B. In some examples, the inputs of the lift 214 and corresponding outputs of the suspension sensor 207B can be used by the calibration manager 208 to generate a force-displacement curve for the second suspension component 206B and the second suspension sensor 207B. In some examples, the generated force-displacement curve can be stored on a memory associated with the vehicle 201 and used by the vehicle 201 (e.g., by an electronic control unit (ECU) of the vehicle 201, etc.) during consumer operation to determine the load on the second suspension component 206B based on an output of the second suspension sensor 207B.

The output of the suspension sensor (not illustrated) corresponding to the passenger-rear suspension component (not illustrated) can be calibrated by disposing the lift 214 under a passenger side frame location corresponding to the vehicle location 218 and conducting a calibration cycle to generate a corresponding force-displacement curve for the passenger-rear suspension component. Similarly, the output of the first suspension sensor 207A can be calibrated by moving the lift 214 and the force transducer 216 to a vehicle location closer to the first suspension component 206A and conducting a calibration cycle to generate a corresponding force-displacement curve for the first suspension component 206A. In some examples, the calibration of the front suspension sensors (e.g., including the first suspension sensor 207A, etc.) can be omitted due to smaller load variations associated with the front of the vehicle 201. For example, the front of the vehicle 201 includes the components of the vehicle powertrain that make larger load variations on the front of the vehicle 201 uncommon (e.g., there is not space for a consumer to load cargo on the front of the vehicle 201, etc.). In other examples, if the vehicle 201 has a configuration that can have large front load variations (e.g., having a front trunk, etc.), the calibration of the rear suspension sensors can be omitted. In other examples, each of the suspension sensors associated with the vehicle 201 (e.g., the first suspension sensors 207A, the second suspension sensor 207B, etc.) can be calibrated via the calibration apparatus 200.

The calibration manager 208 manages the operations of the calibration apparatus 200. For example, the calibration manager 208 can cause the lift 214 and force transducer 216 to engage the location 218 of the vehicle 201. The calibration manager 208 can cause a sequence of forces to be applied to the location 218 and record the corresponding outputs of the suspension sensor 207B. In some examples, the calibration manager 208 can repeat the sequence of forces multiple times to increase the accuracy of the generated force displacement curve and mitigate the effects of hysteresis. During the engagement of the lift 214 and the force transducer 216, the calibration manager 208 can cause the engagement of the clamp 211 and/or the anti-roll mechanism 212. In some examples, the calibration manager 208 can adjust the generated force/displacement data to account for the movement of the center of the mass of the vehicle 201 caused by the displacement of the suspension components 206A, 206B. In some such examples, the calibration manager 208 can compensate for the movement of the center of gravity using vehicle inertial data gathered in an earlier calibration/testing process. An example implementation of the calibration manager 208 is described below in conjunction with FIG. 3.

Figure 3:
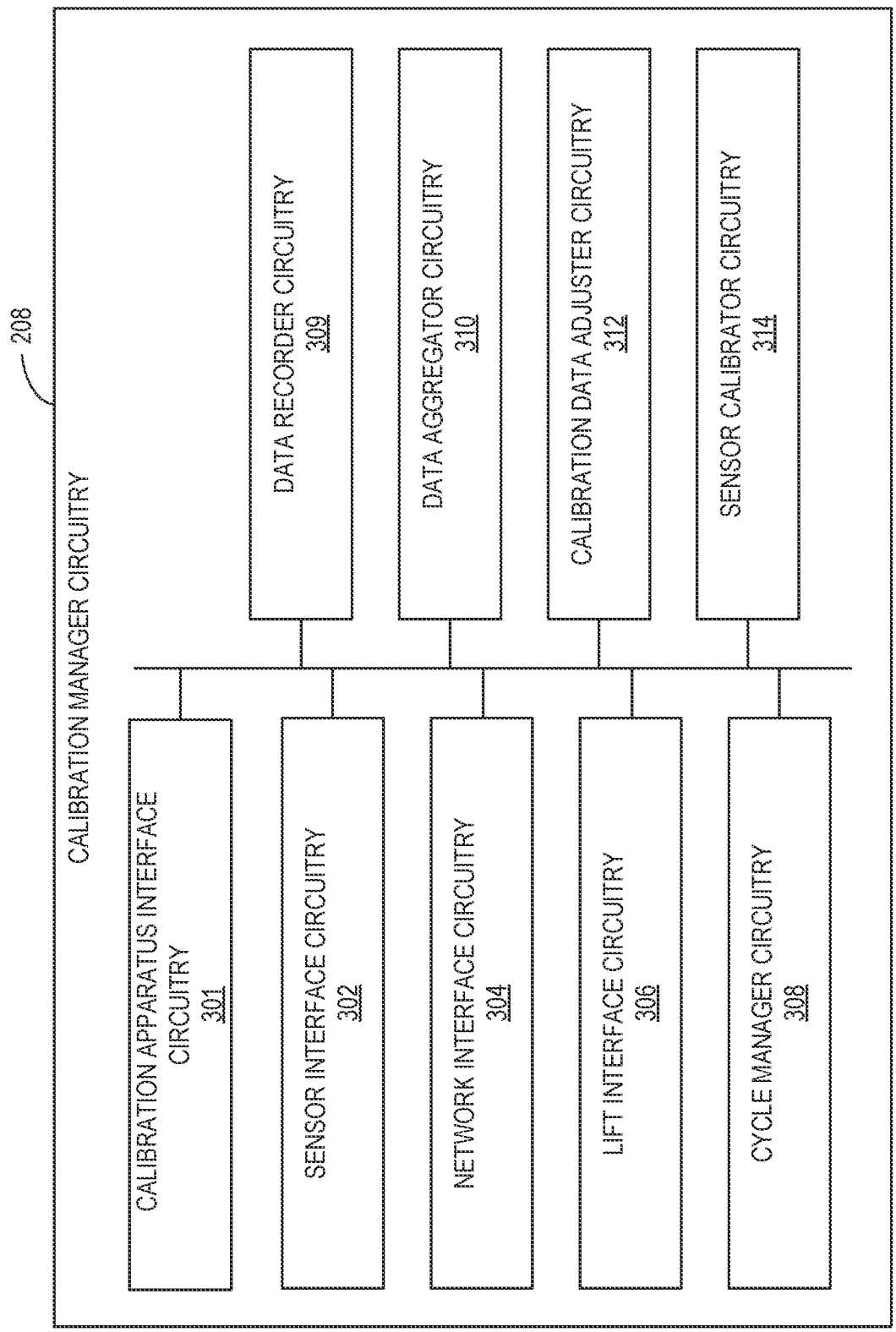
FIG. 3 is a block diagram of the calibration manager of FIG. 2.

FIG. 3 is a block diagram of the calibration manager 208 of FIG. 1 to operate the calibration apparatus 200 of FIG. 2 to calibrate the sensors associated with the suspension components 206A, 206B. In the illustrated example of FIG. 3, the calibration manager 208 includes example calibration apparatus interface circuitry 301, example sensor interface circuitry 302, example network interface circuitry 304, example hydraulic lift interface circuitry 306, example cycle manager circuitry 308, example data recorder circuitry 309, example data aggregator circuitry 310, example calibration data adjuster circuitry 312, and example sensor calibrator circuitry 314. The calibration manager 208 of FIG. 3 may be instantiated (e.g., creating an instance of, bring into being for any length of time, materialize, implement, etc.) by processor circuitry such as a central processing unit executing instructions. Additionally or alternatively, the calibration manager 208 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The calibration apparatus interface circuitry 301 engages the anti-roll mechanism 212. For example, the calibration apparatus interface circuitry 301 can cause a fixture and/or feature associated with the anti-roll mechanism 212 (e.g., one or more pins, one or more clamps, one or more wheel blocks, etc.) to engage with the frame and/or body of the vehicle 201 to prevent the vehicle 201 from rolling. In some examples, the engagement of the anti-roll mechanism 212 by the calibration apparatus interface circuitry 301 can be omitted. In some such examples, a user of the calibration apparatus 200 can engage the brakes of the vehicle 201 manually (e.g., via the brake pedal, via a parking brake lever, etc.). Additionally or alternatively, the calibration apparatus interface circuitry 301 can interface (e.g., via a wired connection, via a wireless connection, etc.) with the CAN bus of the vehicle 201 to engage the brakes of the vehicle 201.

The sensor interface circuitry 302 receives data from the sensors of the calibration apparatus 200 and/or the vehicle 201. For example, the sensor interface circuitry 302 can receive sensor data from the platform sensors 210 and/or the suspension sensors 207A, 207B. In some examples, the sensor interface circuitry 302 can convert the data received from the sensors 207A, 207B, 302 into a numerical form (e.g., human readable, etc.).

The network interface circuitry 304 interfaces with networks associated with the calibration apparatus 200, the vehicle 201, and/or other networks. For example, the network interface circuitry 304 receives vehicle mass data, vehicle corner weights, and/or vehicle inertia data. For example, the network interface circuitry 304 can receive data gathered by other stations/apparatus of an assembly line prior to the beginning of operation of the calibration apparatus 200. In other examples, the network interface circuitry 304 can interface with a database (e.g., a database associated with the vehicle 201, a database associated with the calibration apparatus 200, a database associated with a manufacturer of the vehicle 201, etc.). In other examples, the network interface circuitry 304 can be absent. In some such examples, the vehicle mass data, vehicle corner weights, and/or vehicle inertia data can be sensed and/or recorded from the platform sensors 210 via the sensor interface circuitry 302.

The lift interface circuitry 306 interfaces with the lift 214 of the calibration apparatus 200. The lift interface circuitry 306 can cause the lift 214 to engage the location 218 and/or apply a force to the location 218. For example, the lift interface circuitry 306 engages the force transducer 216 and the lift 214 to the location 218. For example, the lift interface circuitry 306 can cause the lift 214 to raise until the force transducer 216 and/or a top surface of the lift 214 directly contacts the location 218. In some examples, the lift interface circuitry 306 can interface with the platform sensors 210 (e.g., via the sensor interface circuitry 302, etc.) to locate the vehicle location 218 (e.g., via one or more optical sensors, via one or more radar sensors, etc.). Additionally or alternatively, the life interface circuitry 306 can use a robotic control arm associated with the calibration apparatus 200 to guide the force transducer 216 and the lift 214 to the location 218.

The cycle manager circuitry 308 determines the magnitude and sequences of force applied by the lift 214 to the vehicle location 218. For example, the cycle manager circuitry 308 can, via the lift interface circuitry 306 cause the lift 214 to apply different forces to the vehicle 201 in series of discrete steps (e.g., in discrete applied magnitude of force steps, in discrete applied percentage of the GAWR steps, etc.). In some such examples, the steps of the cycle manager circuitry 308 can be equal in magnitude (e.g., 500 Newtons steps, 5% of GAWR steps, etc.). In other examples, the cycle manager circuitry 308 can be unequal (e.g., larger steps near the neutral position of the suspension position, smaller steps near full rebound position of the suspension component, etc.). In other examples, the cycle manager circuitry 308 can continuously vary the applied force (e.g., the linearly, non-linearly, etc.) until a preset maximum force is applied. Additionally or alternatively, the cycle manager circuitry 308 can, based on feedback from the platform sensors 210, cause the lift 214 to displace the suspension component 206B into a plurality of preset positions (e.g., 25% rebound, 50% rebound, full rebound, etc.).

In some examples, the cycle manager circuitry 308 determines how many calibration cycles are to be repeated. For example, the cycle manager circuitry 308 can repeat the calibration cycle a preset number of cycles (e.g., three cycles, five cycles, etc.). In other examples, the cycle manager circuitry 308 can conduct a preset number of cycles (e.g., two cycles) and then determine if another cycle is to be performed based on the statistical relationship between the force-displacement of the conducted cycles. In some such examples, if the force-displacement curves associated with each cycle are statistically similar, the cycle manager circuitry 308 can determine another cycle is not to be performed. In some such examples, if the force-displacement curves associated with each cycle are not statistically similar, the cycle manager circuitry 308 can conduct additional cycles. In some such examples, the cycle manager circuitry 308 can determine the statistical similarity of generated force-displacement curves via statistical analysis (e.g., via cross-correlation, via similarity analysis, etc.).

The data recorder circuitry 309 records the relationship between the suspension displacement and the force applied by the lift 214. For example, the data aggregator circuitry 310 can record the output of the force transducer 216 (e.g., the force applied by the lift 214, etc.) and the corresponding output of the suspension sensor 207B (e.g., the corresponding displacement of the suspension component 206B, etc.). In some examples, the data recorder circuitry 309 can record the data in a memory associated with the calibration apparatus 200. Additionally or alternatively, the data recorder circuitry 309 can record the data in memory associated with the vehicle 201.

The data aggregator circuitry 310 aggregates the collected data to generate a force-displacement curve. For example, if the cycle manager circuitry 308 conducted multiple calibration cycles, the data aggregator circuitry 310 can average each of the collected data force displacement correlations to generate an aggregated force displacement curve. In some examples, the data aggregator circuitry 310 can discard data from outlier cycles and/or individual data force displacement correlations. Additionally or alternatively, the data aggregator circuitry 310 can perform a weighted average of the cycle data (e.g., higher weighting particular cycles of the calibration process, etc.). In some examples, the data aggregator circuitry 310 can be absent. In some such examples, the calibration data adjuster circuitry 312 can use a most recently generated force-displacement curve.

The calibration data adjuster circuitry 312 adjusts the aggregated data output by the data aggregator circuitry 310. For example, if the data recorded by the calibration apparatus 200 is only in the rebound range of the suspension components 206A, 206B and does not include calibration data related to the compression range of the suspension components 206A, 206B the calibration data adjuster circuitry 312 can estimate the force-displacement curve values in the compression range of the suspension component 206A based on the force-displacement curve values in the rebound range of the suspension components 206A, 206B. For example, the calibration data adjuster circuitry 312 can retrieve a nominal force displacement curve (e.g., design calculated force displacement curve, etc.) via the network interface circuitry 304. In such examples, the calibration data adjuster circuitry 312 can use the nominal force displacement curve and the measured curb height of the vehicle 201 to align (e.g., position, etc.) the recorded rebound force displacement curve to the nominal force displacement curve, thereby estimating the compression behavior of the suspension components 206A, 206B. An example output of the calibration data adjuster circuitry 312 is described below in conjunction with FIG. 3.

In some examples, the calibration data adjuster circuitry 312 adjusts the force-displacement data based on the movement of the center of gravity of the vehicle 201 associated with the lifting of the vehicle 201 by the lift 214. For example, at high force values applied by the lift 214, the center of gravity of the vehicle 201 moves in space relative to the platform 202 due to rebound of the suspension components 206A, 206B caused by the lifting of the vehicle 201. The shifting of the center of gravity causes the percentage of the vehicle mass carried by each of the wheels of the vehicle 201 to change. As such, the recorded force data needs to be adjusted to account for this shifting. Data associated with the movement of the center of gravity can be collected via vehicle inertia measurement testing and retrieved by the network interface circuitry 304.

The sensor calibrator circuitry 314 calibrates the second suspension sensor 207B. For example, the sensor calibrator circuitry 314 can modify a software and/or hardware associate with the vehicle 201 to correlate specific force outputs for a given out of the second suspension sensor 207B. For example, the sensor calibrator circuitry 314 can store the force-displacement curve generated by the calibration data adjuster circuitry 312 on a memory associated with vehicle 201. In such examples, for a given output of the second suspension sensor 207B, the vehicle 201 can determine the force on the suspension component based on the same suspension displacement curve.

While an example manner of implementing the calibration manager 208 of FIG. 2 is illustrated in FIG. 3, one or more of the elements, processes, and/or devices illustrated in FIG. 3 may be combined, divided, re-arranged, omitted, eliminated, and/or implemented in any other way. Further, the example calibration apparatus interface circuitry 301, the example sensor interface circuitry 302, the example network interface circuitry 304, the example hydraulic lift interface circuitry 306, the example cycle manager circuitry 308, the example data recorder circuitry 309, the example data aggregator circuitry 310, the example calibration data adjuster circuitry 312, the example sensor calibrator circuitry 314, and/or, more generally, the example calibration manager 208 of FIGS. 2 and 3, may be implemented by hardware alone or by hardware in combination with software and/or firmware. Thus, for example, any of the example the example calibration apparatus interface circuitry 301, the example sensor interface circuitry 302, the example network interface circuitry 304, the example hydraulic lift interface circuitry 306, the example data recorder circuitry 309, the example cycle manager circuitry 308, the example data aggregator circuitry 310, the example calibration data adjuster circuitry 312, the example sensor calibrator circuitry 314, and/or, more generally, the example calibration manager 208 of FIGS. 2 and 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example calibration manager 208 of FIGS. 2 and 3 may include one or more elements, processes, and/or devices in addition to, or instead of, those illustrated in FIG. 3, and/or may include more than one of any or all of the illustrated elements, processes and devices.

Figure 6:
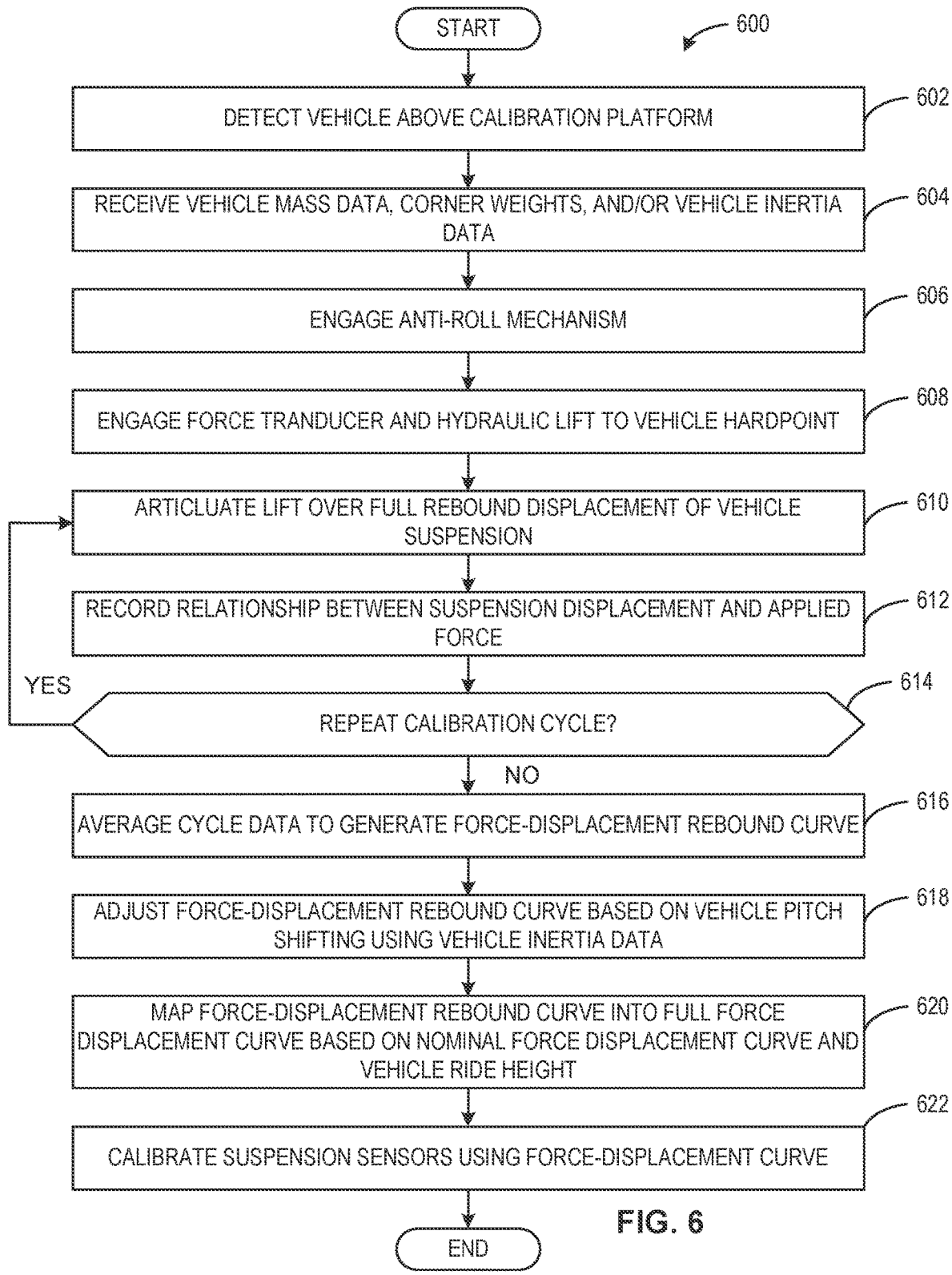
FIG. 6 is a flowchart representative of example machine readable instructions and/or example operations that may be executed by example processor circuitry to implement the calibration manager of FIGS. 2 and 3.

A flowchart representative of example machine readable instructions, which may be executed to configure processor circuitry to implement the calibration manager 208 of FIGS. 2 and 3, is shown in FIG. 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example calibration manager 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
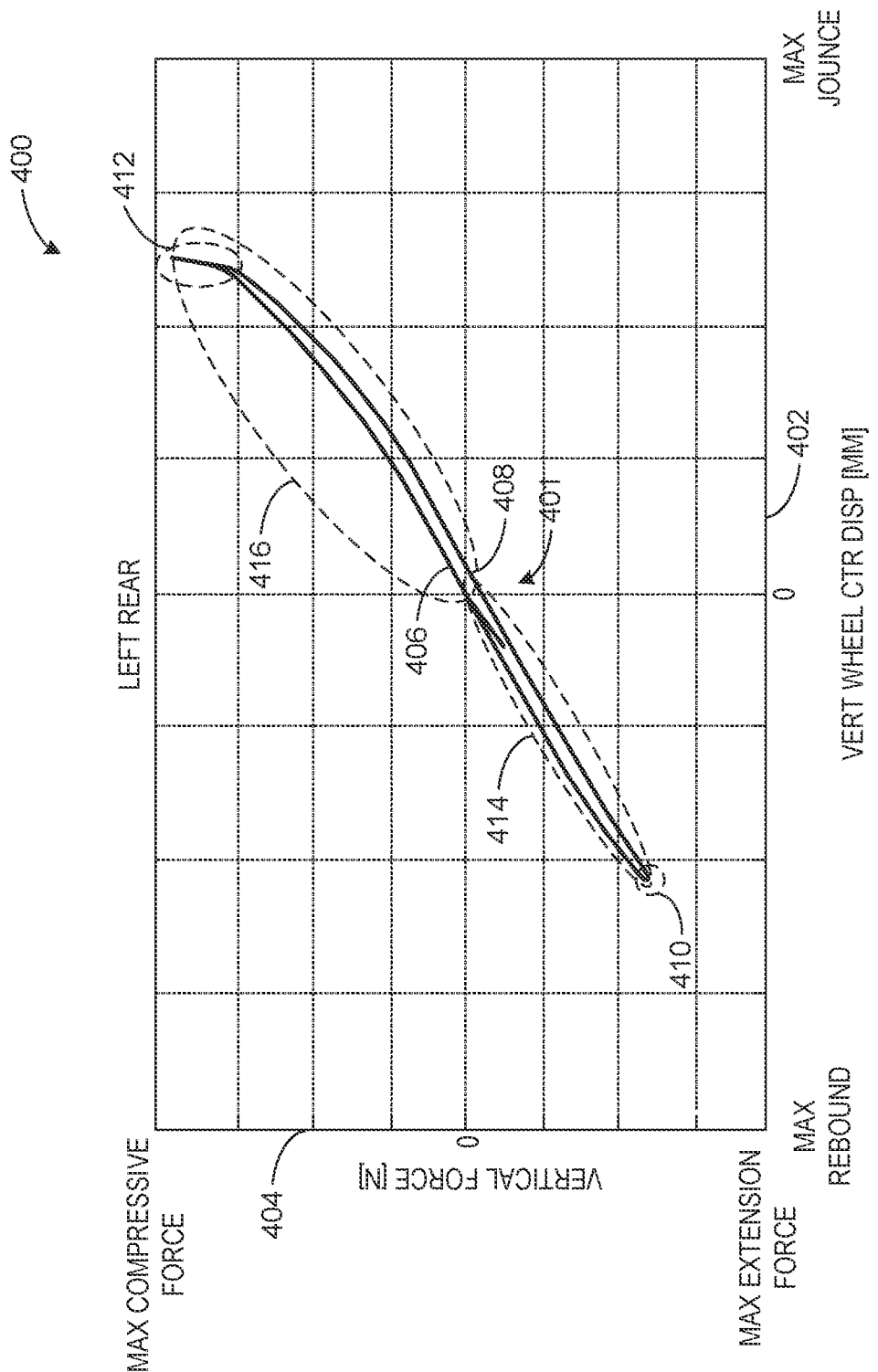
FIG. 4 is a diagram of an example force-displacement curve generated by the calibration manager of FIGS. 2 and 3.

FIG. 4 is an example graph 400 of an example force-displacement curve 401 generated by the calibration manager 208. In the illustrated example of FIG. 4, the graph 400 includes an example x-axis 402 and an example first y-axis 404. In the illustrated example of FIG. 4, the force-displacement curve 401 has an example front face 406 and an example rear face 408. In the illustrated example of FIG. 4, the force-displacement curve 401 has an example first end 410 and an example second end 412. In the illustrated example of FIG. 4, the force-displacement curve 401 has an example rebound portion 414 and an example jounce portion 416.

The x-axis 402 measures the displacement of the suspension component, which ranges from maximum rebound position (e.g., to the left of the 0, etc.) to a maximum jounce position (e.g., to the right of 0, etc.). As used herein, the "neutral position" of a suspension component is the magnitude of extension of the suspension component under curb weight conditions. In the illustrated example of FIG. 4, the neutral position of the suspension component 206B is represented as zero on the x-axis 402. The x-axis 402 can have any suitable distance unit (e.g., millimeters, inches, etc.) and/or dimensionless unit (e.g., percentage of suspension extension, etc.). The y-axis 404 measures the displacement of the suspension component, which ranges from maximum compressive force (e.g., above 0, etc.) to a maximum lifting force (e.g., below 0, etc.). On the y-axis 404, vertical force is measured relative to the curb weight of the vehicle 201. In the illustrated example of FIG. 4, "0" on the y-axis is representative of the vertical force associated with the curb weight of the vehicle 201. The y-axis 404 can have any suitable force unit (e.g., pound-force, newtons, etc.) and/or mass unit (e.g., pound-mass, kilograms, etc.).

In the illustrated example of FIG. 4, the force-displacement curve 401 includes the front face 406 and the rear face 408. In some examples, the front face 406 of the first portion 414 represents the initial movement of the suspension component 206B from a neutral position to the first end 410 (e.g., the fully extended position of the suspension component 206B, etc.) and the rear face 408 of the first portion 414 represents the return of the suspension component 206B from the first end 410 to the neutral position. Similarly, the front face 406 of the second portion 416 represents the movement of the second suspension component 206B from the neutral position to the second end 412 (e.g., the fully compressed position of the suspension component 206B, etc.) and the rear face 408 of the second portion 416 represents the return of the suspension component 206B from the second end 412 to the neutral position. In the illustrated example of FIG. 4, the gap between the front face 406 and the rear face 408 is caused by hysteresis and parasitic effects in the suspension system of the vehicle 201 (e.g., frictional effects, strain-based effects, etc.).

In the illustrated example of FIG. 4, at the second end 412 of the force-displacement curve 401, the front face 406 and the rear face 408 converge to a single line, which has a substantially different slope than the rest of second portion 416. In some such examples, the behavior of the force-displacement curve 401 at the second end 412 is associated with the contact of a jounce bumper of the suspension component 206B with a bumper stop of the suspension component 206B. In other examples, the suspension component 206B does not include a jounce bumper and the force-displacement curve 401 behaves differently at the second end 412.

In some examples, like the example of FIG. 2, force-displacement data is only gathered in the rebound range of the suspension component 206B (e.g., the first portion 414 of FIG. 4) as the calibration apparatus 200 is configured to apply lifting force to the vehicle 201 and not a compressive force (e.g., a pulling force, etc.) to the vehicle 201. In such examples, the second portion 416 is estimated based on the first portion 414. For example, the second portion 416 can be estimated based on the initial behavior of the curve near the neutral position, the curb height of the vehicle 201, and the nominal force-displacement behavior of the second suspension component 206B. In some such examples, the force-displacement data gathered using the calibration process is aligned with the measured curb height of the vehicle 201 and nominal behavior in compression is appended to the collected calibration data. In other examples, the second portion 416 can be estimated by any other suitable means. In some examples, if the calibration apparatus 200 is able to apply compressive forces, the data gathered during the calibration process is used to directly generate the second portion 416.

Figure 5:
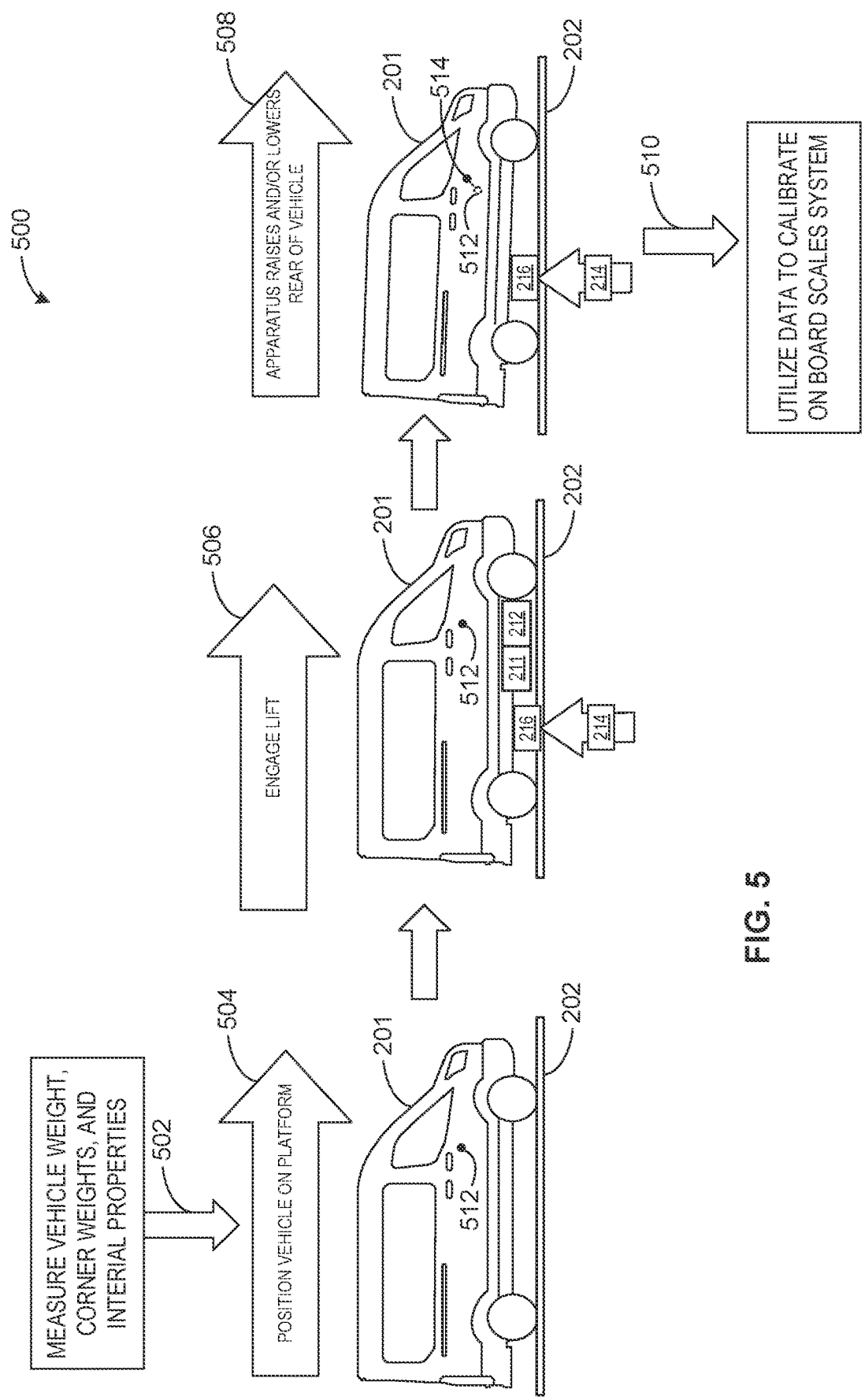
FIG. 5 is a diagram of an example calibration process that can be used in conjunction with the system of FIG. 2.

FIG. 5 is a diagram of an example calibration process 500 that can be used in conjunction with the calibration apparatus 200 of FIG. 2. In the illustrated example of FIG. 5, the calibration process 500 includes an example first operation 502, an example second operation 504, an example third operation 506, an example fourth operation 508, and an example fifth operation 510. In the illustrated example of FIG. 5, during the execution of the second operation 504 and the third operation 506, the center of gravity of the vehicle 201 has an example first absolute position 512. During the execution of the fourth operation 508, the center of gravity of the vehicle 201 moves from the first absolute position 512 to a plurality of different positions, including an example second absolute position 514.

At the first example operation 502, the vehicle weight, corner weights, and inertial properties are measured. For example, the vehicle weight (e.g., the overall vehicle weight, etc.) and/or the corner weights (e.g., the weights carried by each of the wheels 204A, 204B, etc.) can be measured by scales earlier in the assembly and/or calibration process of the vehicle 201. In some examples, the vehicle inertia properties (e.g., moments of inertia, frictional coefficients, drag coefficients, the first position 512 of the center of gravity, etc.) can be measured by compliance and kinematics testing earlier in the assembly and/or calibration process. In other examples, the vehicle weight, corner weights, and inertial properties can be measured by the platform sensors 210. In some examples, the gathered vehicle properties can be accessed by the calibration apparatus interface circuitry 301. At the second operation 504, the vehicle 201 is moved over the platform 202. For example, the vehicle 201 can be moved onto the platform 202 via a conveyer and/or track. In other examples, an operator of the calibration apparatus 200 can drive the vehicle 201 onto the platform 202. In other examples, the vehicle 201 can be positioned on the platform 202 by any other suitable means.

At the third operation 506, the lift 214 and force transducer 216 are engaged to the vehicle 201. For example, the calibration manage 208 (e.g., the lift interface circuitry 306, etc.) can cause the lift 214 to raise from the platform 202 and interface with the location 218 of the vehicle 201. In some examples, the lift 214 can positioned under the vehicle 201 from the side of the vehicle 201 (e.g., on a control arm). In some examples, the lift 214 can be positioned at the appropriate position under the vehicle 201 via a robotic control arm. In some examples, during the execution of operation 506, the anti-roll mechanism 212 of FIG. 2 and/or the clamp 211 of FIG. 2 can be engaged to the body and/or frame of the vehicle 201.

At the fourth operation 508, the lift 214 raises and/or lowers the vehicle 201 by applying a variety of forces to the vehicle 201. In some examples, the calibration apparatus 200 can record the applied force (e.g., measured by the force transducer 216, etc.) and the corresponding output of the second suspension sensor 207B. In some examples, the lift 214 only applies lifting forces and the captured force displacement data is only in the rebound range of the second suspension component 206B. In such examples, the calibration manager 208 can estimate the compressive behavior of the second suspension component 206B based on the gathered rebound behavior, the curb height of the vehicle 201, and the nominal force-displacement relationship of the second suspension component 206B. During the lifting and compression of the vehicle 201, the center of gravity of the vehicle 201 can move from the first position 512 (e.g., relative to the calibration apparatus 200, etc.). For example, the second position 514 corresponds to the location of the center of gravity when the suspension component 206B is in the maximum rebound location (e.g., the second end 412, etc.). The movement of the center of gravity (e.g., in absolute terms, etc.) causes the corner weights of the vehicle 201 to change, thereby changing the location of the neutral position of the force-displacement curve 401. Accordingly, by estimating the movement of the center of gravity, the calibration apparatus 200 can correct the gathered data to ensure the accuracy of the record force-displacement data.

At the first operation 510, the second suspension sensor 207B is calibrated using the collected force-displacement data. For example, the calibration manager 208 can generate a force-displacement curve (e.g., the force-displacement curve 401 of FIG. 4, etc.) using the collected force-displacement data. In some examples, after the calibration manager 208 generates a force-displacement curve using the collected data, the curve can be stored in a memory associated with the vehicle 201 and used to interpret future outputs of the second suspension sensor 207B. In some examples, additional calibration steps can be interposed between some or all of the operations 502, 504, 506, 508, 510. In some examples, some of the operations 502, 504, 506, 508, 510 can be omitted. In some examples, the vehicle 201 and/or the lift 214 can be repositioned and the calibration process 500 can repeated for the other suspension components of the vehicle 201.

FIG. 6 is a flowchart representative of example machine readable instructions and/or example operations 600 that may be executed and/or instantiated by processor circuitry to calibrate the ride height sensors of a vehicle using the calibration apparatus of FIG. 2. The machine readable instructions and/or the operations 600 of FIG. 6 begin at block 602, at which the sensor interface circuitry 302 detects a vehicle above the calibration platform. For example, the sensor interface circuitry 302 receives data from the sensors of the calibration apparatus 200 and/or the vehicle 201. For example, the sensor interface circuitry 302 can receive sensor data from the platform sensors 210 that indicates the vehicle 201 is disposed on the platform 202 (e.g., a change in the weight on the platform 202, indication on the optical sensor, etc.). In other examples, a user of the calibration apparatus 200 can manually input that the vehicle 201 is positioned on the platform 202.

At block 604, the network interface circuitry 304 receives vehicle mass data, vehicle corner weights, and/or vehicle inertia data. For example, the network interface circuitry 304 can receive data gathered by other stations/apparatus of an assembly line prior to the beginning of operations 600. In other examples, the network interface circuitry 304 can interface with a database (e.g., a database associated with the vehicle 201, a database associated with the calibration apparatus 200, a database associated with a manufacturer of the vehicle 201, etc.). In other examples, the network interface circuitry 304 can be absent. In some such examples, the vehicle mass data, vehicle corner weights, and/or vehicle inertia data can be sensed and/or recorded from the platform sensors 210 via the sensor interface circuitry 302.

At block 606, the calibration apparatus interface circuitry 301 engages the anti-roll mechanism 212. For example, the calibration apparatus interface circuitry can cause a fixture and/or feature associated with the anti-roll mechanism 212 (e.g., one or more pins, one or more clamps, one or more wheel blocks, etc.) to engage with the frame and/or body of the vehicle 201 to prevent the vehicle 201 from rolling. In some examples, the engagement of the anti-roll mechanism 212 by the calibration apparatus interface circuitry 301 can be omitted. In some such examples, a user of the calibration apparatus 200 can engage the brakes of the vehicle 201 manually (e.g., via the brake pedal, via a parking brake lever, etc.). Additionally or alternatively, the calibration apparatus interface circuitry 301 can interface (e.g., via a wired connection, via a wireless connection, etc.) with the CAN bus of the vehicle 201 to engage the brakes of the vehicle 201.

At block 608, the lift interface circuitry 306 engages the force transducer 216 and lift 214 to the location 218. For example, the lift interface circuitry 306 can cause the lift 214 to raise until the force transducer 216 and/or a top surface of the lift 214 directly contacts the location 218. In some examples, the lift interface circuitry 306 can interface with the platform sensors 210 (e.g., via the sensor interface circuitry 302, etc.) to locate the vehicle location 218 (e.g., via one or more optical sensors, via one or more radar sensors, etc.). Additionally or alternatively, the life interface circuitry 306 can use a robotic control arm associated with the calibration apparatus 200 to guide the force transducer 216 and lift 214 to the location 218.

At block 610, the cycle manager circuitry 308 articulates lift 214 over the full rebound displacement of vehicle suspension. For example, the cycle manager circuitry 308 can, via the lift interface circuitry 306 can cause the lift 214 to apply different forces to the vehicle 201 in series of discrete steps (e.g., in discrete applied magnitude of force steps, in discrete applied percentage of the GAWR steps, etc.). In some such examples, the steps of the cycle manager circuitry 308 can be equal in magnitude (e.g., 500 Newtons steps, 5% of GAWR steps, etc.). In other examples, the cycle manager circuitry 308 can be unequal in magnitude (e.g., larger steps near neutral position of the suspension position, smaller steps near full rebound position of the suspension component, etc.). In other examples, the cycle manager circuitry 308 can continuously vary the applied force until a preset maximum force is applied. Additionally or alternatively, the cycle manager circuitry 308 can, based on feedback from the platform sensors 210, cause the lift 214 to displace the suspension component 206B into a plurality of preset positions (e.g., 25% rebound, 50% rebound, full rebound, etc.). In other examples, the cycle manager circuitry 308 articles the lift 214 over the full range of the second suspension component 206B (e.g., including the compression range, etc.).

At block 612, the data recorder circuitry 309 records the relationship between the suspension displacement and the force applied by the lift 214. For example, the data aggregator circuitry 310 can record the output of the force transducer 216 (e.g., the force applied by the lift 214, etc.) and the corresponding output of the suspension sensor 207B (e.g., the corresponding displacement of the suspension component 206B, etc.). In other examples, the data recorder circuitry 309 can record the data in any other suitable manner.

At block 614, the cycle manager circuitry 308 determines if the calibration cycle is to be repeated. For example, the cycle manager circuitry 308 can repeat the calibration cycle (e.g., the operations of blocks 610, 612, etc.) a preset number of cycles (e.g., three cycles, five cycles, etc.). In other examples, the cycle manager circuitry 308 can conduct a preset number of cycles (e.g., two cycles) and then determine if another cycle is to be performed based on the statistical relationship between the conducted cycles. In some such examples, if the force-displacement curves associated with each cycle are statistically similar, the cycle manager circuitry 308 can determine another cycle is not to be performed. In some such examples, if the force-displacement curves associated with each cycle are not statistically similar the cycle manager circuitry 308 can conduct additional cycles.

At block 616, the data aggregator circuitry 310 averages the cycle data to generate force displacement rebound curve. For example, if the cycle manager circuitry 308 conducted multiple calibration cycles, the data aggregator circuitry 310 can average each of the collected data force displacement correlations to generate an aggregated force displacement curve. In some examples, the data aggregator circuitry 310 can discard data from outlier cycles and/or individual data force displacement correlations. Additionally or alternatively, the data aggregator circuitry 310 can generate a weighted average of cycle data (e.g., higher weighting particular cycles of the calibration process, etc.).

At block 618, the calibration data adjuster circuitry 312 adjusts the force-displacement rebound curve based on vehicle pitch shifting using vehicle inertia data. For example, the calibration data adjuster circuitry 312 can adjust the force-displacement data based on the movement of the center of gravity of the vehicle 201 associated with lifting caused by the lift 214. For example, at high force values applied by the lift 214, the center of gravity of the vehicle 201 moves in physical space due to rebound of the suspension components 206A, 206B caused by the lifting of the vehicle 201. The shifting of the center of gravity causes the percentage of the vehicle mass carried by each of the wheels of the vehicle 201 to change. As such, the recorded force data needs to be adjusted to account for this shifting. Data associated with the movement of the center of gravity can be collected via vehicle inertia measurement testing and retrieved by the network interface circuitry 304.

At block 620, the calibration data adjuster circuitry 312 maps the force-displacement rebound curve into a full force displacement curve based on a nominal force displacement curve and vehicle ride height. For example, if the data recorded by the calibration apparatus 200 is only in the rebound range of the second suspension component 206B and does not include calibration data related to the compression range of the second suspension component 206B, the calibration data adjuster circuitry 312 can estimate the force-displacement curve values in the compression range of the suspension components 206A, 206B based on the force-displacement curve values in the rebound range of the suspension components 206A, 206B. For example, the calibration data adjuster circuitry 312 can retrieve a nominal force displacement curve (e.g., design calculated force displacement curve, etc.) via the network interface circuitry 304. In such examples, the calibration data adjuster circuitry 312 can use the nominal force displacement curve and the measured curb height of the vehicle 201 to align (e.g., position, etc.) the recorded rebound force displacement curve to the nominal force displacement curve, thereby estimating the compression behavior of the suspension components 206A, 206B.

At block 622, the sensor calibrator circuitry 314 calibrates the suspension sensor using the generated force-displacement curve. For example, the sensor calibrator circuitry 314 can modify software and/or hardware associate with the vehicle 201 to correlate specific force outputs for a given output of the second suspension sensor 207B. For example, the sensor calibrator circuitry 314 can store the force-displacement curve generated by the calibration data adjuster circuitry 312 on a memory associated with vehicle 201. In such examples, for a given output of the second suspension sensor 207B, the vehicle 201 can determine the force on the suspension component based on the same suspension displacement curve.

Figure 7:
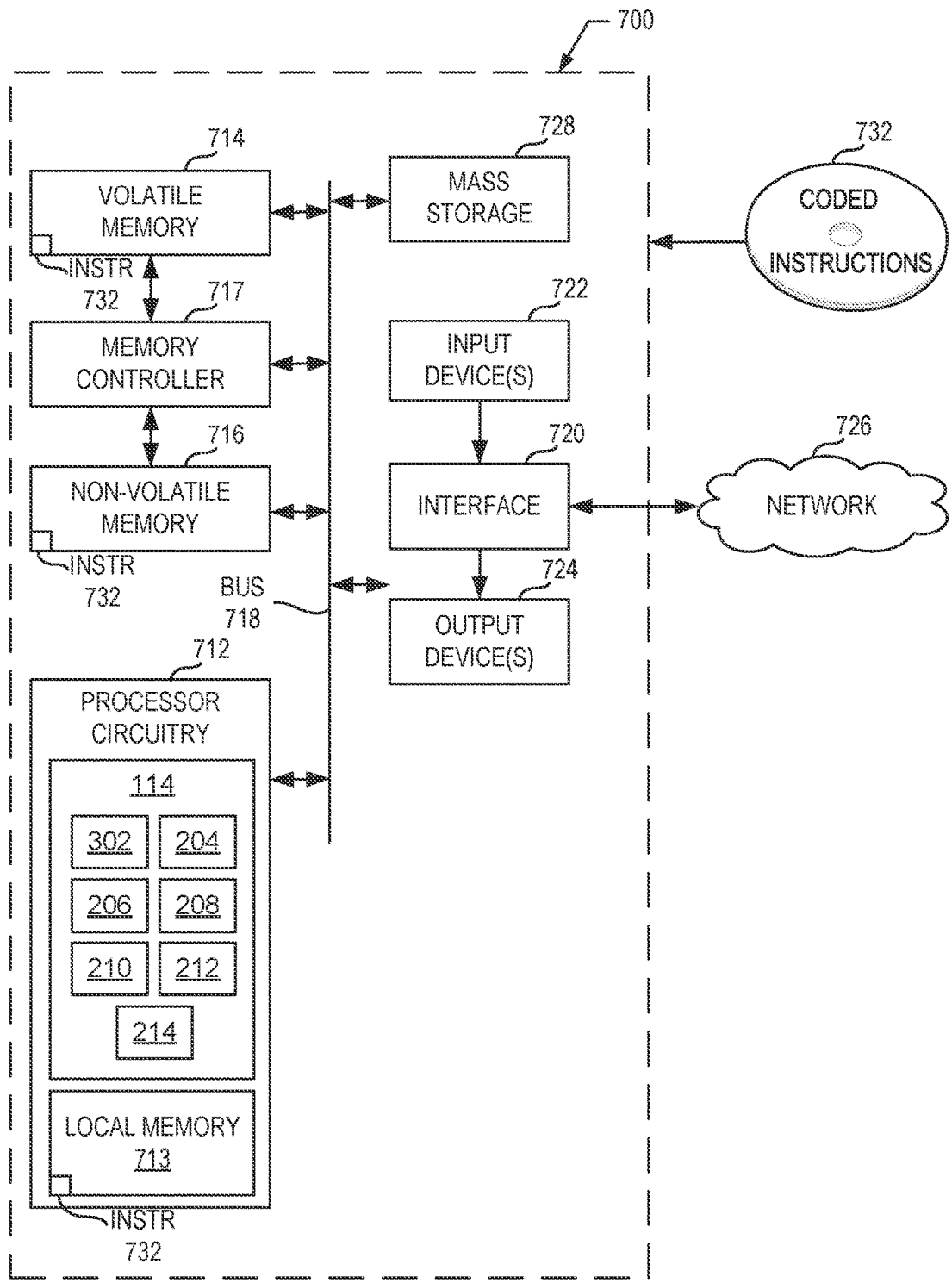
FIG. 7 is a block diagram of an example processing platform including processor circuitry structured to execute the example machine readable instructions and/or the example operations of FIG. 6 to implement the calibration manager of FIGS. 2 and 3.

FIG. 7 is a block diagram of an example processor platform 700 structured to execute and/or instantiate the machine readable instructions and/or the operations of FIG. 6 to implement the calibration manager 208 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the sensor interface circuitry 302, the network interface circuitry 304, the lift interface circuitry 306, the cycle manager circuitry 308, the data aggregator circuitry 310, the calibration data adjuster circuitry 312, and the sensor calibration circuitry 314.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIG. 6, may be stored in the mass storage device 728, in the volatile memory 714, in the non-volatile memory 716, and/or on a removable non-transitory computer readable storage medium such as a CD or DVD.

Figure 8:
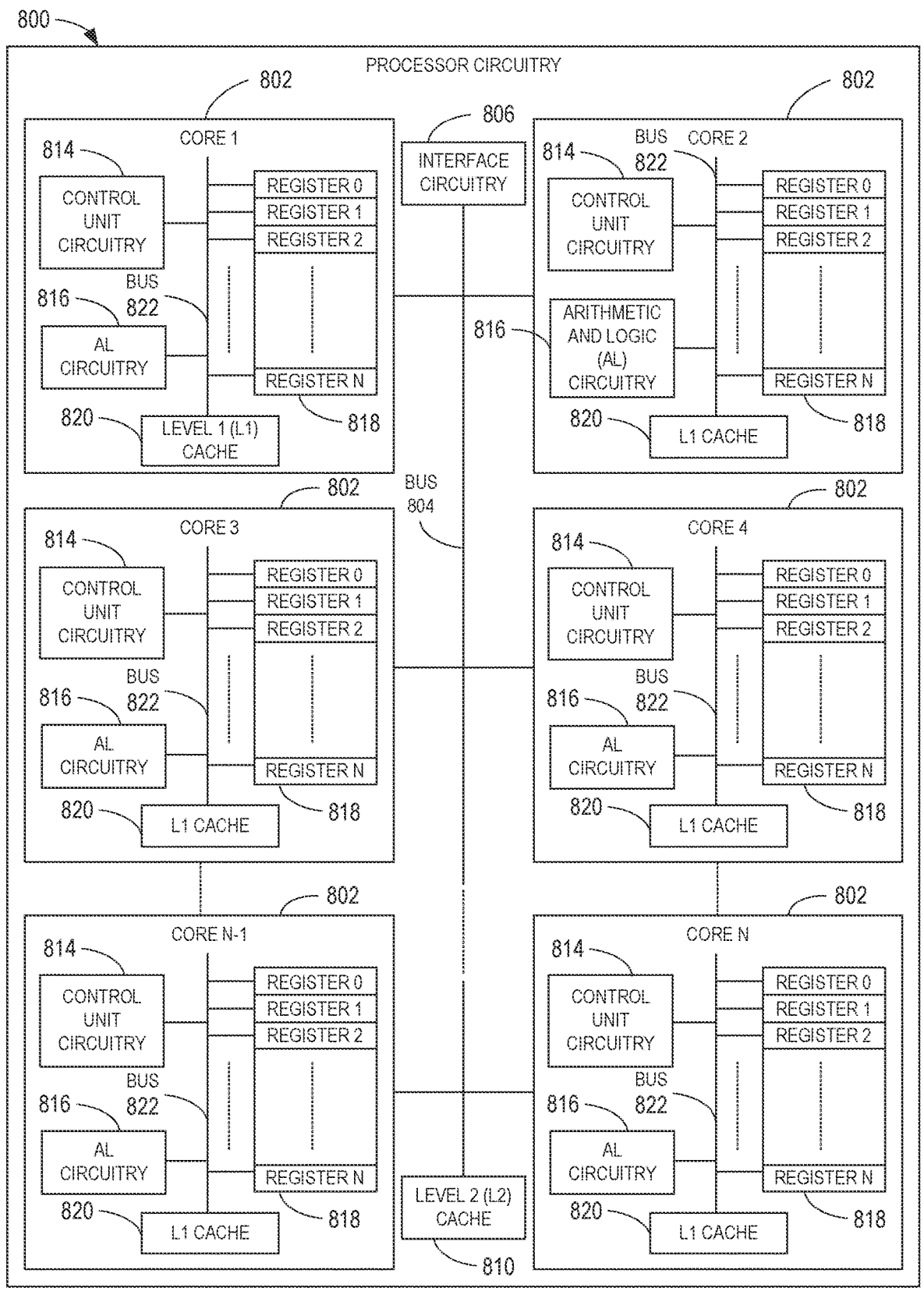
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowchart of FIG. 6 to effectively instantiate the circuitry of FIG. 3 as logic circuits to perform the operations corresponding to those machine readable instructions. In some such examples, the circuitry of FIG. 3 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry 816 (sometimes referred to as an ALU), a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
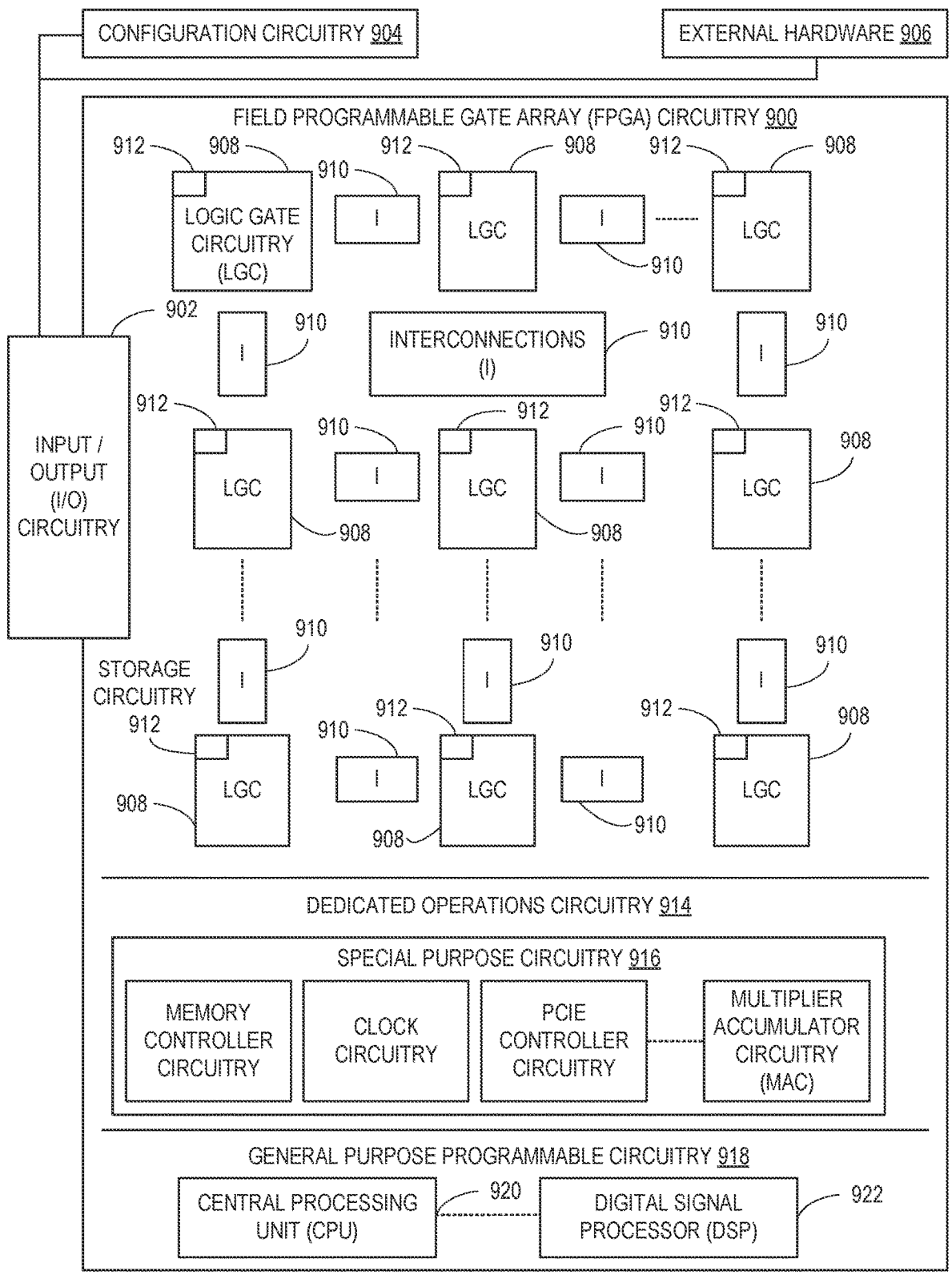
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 6. As such, the FPGA circuitry 900 may be structured to effectively instantiate some or all of the machine readable instructions of the flowchart of FIG. 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIG. 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 6 may be executed by one or more of the cores 802 of FIG. 8, a second portion of the machine readable instructions represented by the flowchart of FIG. 6 may be executed by the FPGA circuitry 900 of FIG. 9, and/or a third portion of the machine readable instructions represented by the flowchart of FIG. 6 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Example methods, apparatus, systems, and articles of manufacture to determine the load of a vehicle via calibrate a suspension sensor are disclosed herein. Further examples and combinations thereof include the following:

Example methods, apparatus, systems, and articles of manufacture to calibrate suspension sensors are disclosed herein. Further examples and combinations thereof include the following:

Example 1 includes an apparatus comprising a force transducer, an actuator operatively coupled to the force transducer, memory including instructions, and a processor to execute the instructions to engage the actuator to a bottom surface of a vehicle, apply a first force to the bottom surface via the actuator, determine a first displacement of a first suspension component of the vehicle, and calibrate a first sensor of the vehicle based on the first force and the first displacement.

Example 2 includes the apparatus of example 1, wherein the processor executes the instructions to interface with a controlled area network (CAN) bus of the vehicle to engage a brake of the vehicle while the actuator is engaged.

Example 3 includes the apparatus of example 1, further including an anti-roll feature, the anti-roll feature including at least one of (1) a pin to be disposed through a component of the vehicle, or (2) a clamp to be disposed about the component.

Example 4 includes the apparatus of example 1, wherein the processor is to execute the instructions to generate a force-displacement curve based on a spring-rate of the first suspension component, each value of the force-displacement curve corresponding to (1) a first one of a plurality of forces applied by the actuator and (2) an associated displacement of the first suspension component, the force-displacement curve including the first force and the first displacement.

Example 5 includes the apparatus of example 1, wherein the first sensor is a ride height sensor of the vehicle.

Example 6 includes the apparatus of example 1, wherein the processor executes the instructions to estimate a movement of a center of mass of the vehicle associated with an application of the first force, and adjust the first displacement based on the estimated movement of the center of mass.

Example 7 includes the apparatus of example 1, wherein the bottom surface is adjacent the first suspension component of the vehicle, the first sensor is associated with the first suspension component of the vehicle and the processor executes the instructions to calibrate a second sensor of the vehicle based on force-displacement data associated with a second suspension component of the vehicle.

Example 8 includes a method comprising engaging an actuator of a calibration system to a bottom surface of a vehicle, applying a first force to the bottom surface via the actuator, determining a first displacement of a first suspension component of the vehicle, and calibrating a first sensor of the vehicle based on the first force and the first displacement.

Example 9 includes the method of example 8, further including interfacing with a controlled area network (CAN) bus of the vehicle to engage a brake of the vehicle while the actuator is engaged.

Example 10 includes the method of example 8, further including engaging an anti-roll feature, the anti-roll feature including at least one of (1) a pin to be disposed through a component of the vehicle, or (2) a clamp to be disposed about the component.

Example 11 includes the method of example 8, further including generating a force-displacement curve based on a spring-rate of the first suspension component, each value of the force-displacement curve corresponding to (1) a first one of a plurality of forces applied by the actuator and (2) an associated displacement of the first suspension component, the force-displacement curve including the first force and the first displacement.

Example 12 includes the method of example 8, wherein the first sensor is a ride height sensor of the vehicle.

Example 13 includes the method of example 8, further including estimating a movement of a center of mass of the vehicle associated with an application of the first force, and adjusting the first displacement based on the estimated movement of the center of mass.

Example 14 includes the method of example 8, wherein the bottom surface is adjacent the first suspension component of the vehicle, the first sensor is associated with the first suspension component of the vehicle and further including calibrating a second sensor of the vehicle based on force-displacement data associated with a second suspension component of the vehicle.

Example 15 includes a non-transitory computer readable medium comprising instructions, which when executed, cause a processor to engage an actuator of a calibration system to a bottom surface of a vehicle, apply a first force to the bottom surface via the actuator, determine a first displacement of a first suspension component of the vehicle, and calibrate a first sensor of the vehicle based on the first force and the first displacement.

Example 16 includes the non-transitory computer readable medium of example 15, wherein the instructions, when executed, cause the processor to interface with a controlled area network (CAN) bus of the vehicle to engage a brake of the vehicle while the actuator is engaged.

Example 17 includes the non-transitory computer readable medium of example 15, further including engaging an anti-roll feature, the anti-roll feature including at least one of (1) a pin to be disposed through a component of the vehicle, or (2) a clamp to be disposed about the component.

Example 18 includes the non-transitory computer readable medium of example 15, wherein the instructions, when executed, cause the processor to generate a force-displacement curve based on a spring-rate of the first suspension component, each value of the force-displacement curve corresponding to (1) a first one of a plurality of forces applied by the actuator and (2) an associated displacement of the first suspension component, the force-displacement curve including the first force and the first displacement.

Example 19 includes the non-transitory computer readable medium of example 15, wherein the instructions, when executed, cause the processor to estimate a movement of a center of mass of the vehicle associated with an application of the first force, and adjust the first displacement based on the estimated movement of the center of mass.

Example 20 includes the non-transitory computer readable medium of example 15, wherein the bottom surface is adjacent the first suspension component of the vehicle, the first sensor is associated with the first suspension component of the vehicle and the processor executes the instructions to calibrate a second sensor of the vehicle based on force-displacement data associated with a second suspension component of the vehicle. The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   a force transducer;
   an actuator operatively coupled to the force transducer;
   memory including instructions; and
   a processor to execute the instructions to:
   engage the actuator to a bottom surface of a sprung mass of a vehicle;
   apply a first force to the bottom surface via the actuator;
   determine a first displacement of a first suspension component of the vehicle; and
   calibrate a first sensor of the vehicle based on the first force and the first displacement.

2. The apparatus of claim 1, wherein the processor executes the instructions to interface with a controlled area network (CAN) bus of the vehicle to engage a brake of the vehicle while the actuator is engaged.

3. The apparatus of claim 1, further including an anti-roll feature, the anti-roll feature including at least one of (1) a pin to be disposed through a component of the vehicle, or (2) a clamp to be disposed about the component.

4. The apparatus of claim 1, wherein the processor is to execute the instructions to generate a force-displacement curve based on a spring-rate of the first suspension component, each value of the force-displacement curve corresponding to (1) a first one of a plurality of forces applied by the actuator and (2) an associated displacement of the first suspension component, the force-displacement curve including the first force and the first displacement.

5. The apparatus of claim 1, wherein the first sensor is a ride height sensor of the vehicle.

6. The apparatus of claim 1, wherein the processor executes the instructions to:
   estimate a movement of a center of mass of the vehicle associated with an application of the first force; and
   adjust the first displacement based on the estimated movement of the center of mass.

7. The apparatus of claim 1, wherein the bottom surface is adjacent the first suspension component of the vehicle, the first sensor is associated with the first suspension component of the vehicle and the processor executes the instructions to calibrate a second sensor of the vehicle based on force-displacement data associated with a second suspension component of the vehicle.

8. A method comprising:
   engaging an actuator of a calibration system to a bottom surface of a sprung mass of a vehicle;
   applying a first force to the bottom surface via the actuator;
   determining a first displacement of a first suspension component of the vehicle; and
   calibrating a first sensor of the vehicle based on the first force and the first displacement.

9. The method of claim 8, further including interfacing with a controlled area network (CAN) bus of the vehicle to engage a brake of the vehicle while the actuator is engaged.

10. The method of claim 8, further including engaging an anti-roll feature, the anti-roll feature including at least one of (1) a pin to be disposed through a component of the vehicle, or (2) a clamp to be disposed about the component.

11. The method of claim 8, further including generating a force-displacement curve based on a spring-rate of the first suspension component, each value of the force-displacement curve corresponding to (1) a first one of a plurality of forces applied by the actuator and (2) an associated displacement of the first suspension component, the force-displacement curve including the first force and the first displacement.

12. The method of claim 8, wherein the first sensor is a ride height sensor of the vehicle.

13. The method of claim 8, further including:
estimating a movement of a center of mass of the vehicle associated with an application of the first force; and
adjusting the first displacement based on the estimated movement of the center of mass.

14. The method of claim 8, wherein the bottom surface is adjacent the first suspension component of the vehicle, the first sensor is associated with the first suspension component of the vehicle and further including calibrating a second sensor of the vehicle based on force-displacement data associated with a second suspension component of the vehicle.

15. A non-transitory computer readable medium comprising instructions, which when executed, cause a processor to:
engage an actuator of a calibration system to a bottom surface of a sprung mass of a vehicle;
apply a first force to the bottom surface via the actuator;
determine a first displacement of a first suspension component of the vehicle; and
calibrate a first sensor of the vehicle based on the first force and the first displacement.

16. The non-transitory computer readable medium of claim 15, wherein the instructions, when executed, cause the processor to interface with a controlled area network (CAN) bus of the vehicle to engage a brake of the vehicle while the actuator is engaged.

17. The non-transitory computer readable medium of claim 15, further including engaging an anti-roll feature, the anti-roll feature including at least one of (1) a pin to be disposed through a component of the vehicle, or (2) a clamp to be disposed about the component.

18. The non-transitory computer readable medium of claim 15, wherein the instructions, when executed, cause the processor to generate a force-displacement curve based on a spring-rate of the first suspension component, each value of the force-displacement curve corresponding to (1) a first one of a plurality of forces applied by the actuator and (2) an associated displacement of the first suspension component, the force-displacement curve including the first force and the first displacement.

19. The non-transitory computer readable medium of claim 15, wherein the instructions, when executed, cause the processor to:
estimate a movement of a center of mass of the vehicle associated with an application of the first force; and
adjust the first displacement based on the estimated movement of the center of mass.

20. The non-transitory computer readable medium of claim 15, wherein the bottom surface is adjacent the first suspension component of the vehicle, the first sensor is associated with the first suspension component of the vehicle and the processor executes the instructions to calibrate a second sensor of the vehicle based on force-displacement data associated with a second suspension component of the vehicle.

\* \* \* \* \*